Dec. 22, 1970  R. C. LAWES ET AL  3,548,658

DRAUGHT GAGE

Filed Feb. 18, 1969

INVENTORS:
ROLAND C. LAWES
FREDERICK LEE JORDAN

BY: *Calvin J. Laiche*

ATTORNEY

United States Patent Office 3,548,658
Patented Dec. 22, 1970

3,548,658
DRAUGHT GAGE
Roland C. Lawes, 700 Carnation Ave., Metairie, La. 70001, and Frederick Lee Jordan, 247 Marmande Ave., Lot 18, New Orleans, La. 70123
Filed Feb. 18, 1969, Ser. No. 800,216
Int. Cl. G01f 23/16
U.S. Cl. 73—302                                                4 Claims

ABSTRACT OF THE DISCLOSURE

Apparatus for determining the draught of a vessel. A tube extends downward to be aligned at tis lower-most point with the bottom of the vessel at which point the tube has an opening. The tube then extends upwardly and is connected above the surface of the water to a water filled manometer. Gas is forced down the downward extension at a pressure sufficient to force gas out the opening aligned with the bottom of the vessel. The condition of flow out the opening is detected by measuring flow of the gas applied to the downward extension. The pressure necessary to force gas out the opening is read on the manometer and thus the draught of the vessel is obtained. The two extensions of the tube are enclosed in tubular housing closed at the bottom by a butterfly valve which has a small aperture to overcome the transient disturbance of waves.

BACKGROUND OF THE INVENTION

The present invention pertains to that field of the art concerned with instruments or devices adapted for reading the draught of a floating vessel.

The most common method or technique by which cargoes are calculated is by determining the dead weight displacement of a vessel. Pursuant to that technique, the draught of the vessel is measured utilizing various procedures which have proven not only to be inaccurate, but additionally to be very inconsistant under a static set of conditions. These procedures are so crude that quite often errors in excess of $5,000.00 worth of cargo are realized. For example, when reading the draught of a barge containing urea with reference to a 1400 ton barge, a one-inch differential in reading the draught of the barge will result in a dead weight displacement difference of about 19 tons. At a cost of at least $80.00 per ton, this would amount to about $1,500.00, viz around one (1%) percent of the value of the cargo which is about $112,000.00.

It is a quite common practice for a barge operator to measure the draught of a barge by measuring the distance between the water level and the top of the barge with a ruler and then subtracting this dimension from the overall heighth of the barge. A barge can be provided with draught marks showing its depth in the water at any given time thereby dispensing with the use of a ruler. In these methods and other related methods, it is extremely difficult, if not impossible, to read the draught of a barge due to the problem of being able to get into position to read the point at exactly where the barge leaves the water. This becomes especially difficult where there is any amount of wave action which is present in most instances. For these and other reasons, an error of at least one inch is commonly encountered. However, by virtue of the present invention, the draught of a vessel can be measured very accurately, generally within one-sixteenth of an inch.

SUMMARY OF THE INVENTION

The present invention is directed to a draught gage which basically comprises: manometer means containing a liquid of essentially the same density as that in which the vessel is immersed whose draught is to be determined; conduit means in open communication with the manometer means; positioning means which are operably connected to the conduit means so as to position the manometer means essentially vertical alongside the vessel with the lower end of the conduit means being positioned essentially even with the bottom of the barge, the bottom of the conduit means being opened; and pressure means for injecting a gaseous medium into the conduit means whereby the pressure required for the gas to escape from the bottom end of the conduit means is indicated on the manometer as a measure of the draught of the vessel. Adjustable attaching means are also provided whereby the present gage can be quickly and conveniently attached to various vessel designs. The influence of wave action is essentially eliminated by utilizing a tubular member which serves as the superstructure of the present device, the level changes within the tubular member being controlled by valve means positioned at its bottom immersed in the water. Of course, the effect of wave action is reduced as the depth of the valve or bottom of the tubular member is increased.

DESCRIPTION OF THE PREFERRED EMBODIMENT

Figure 1:
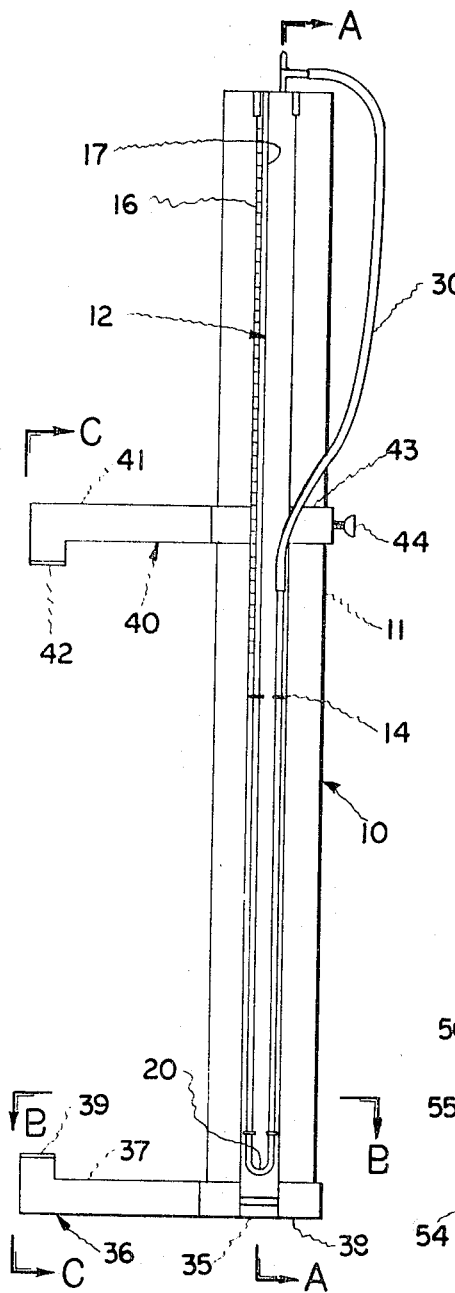
FIG. 1 shows a side elevation view of the present draught gage.
Figure 3:
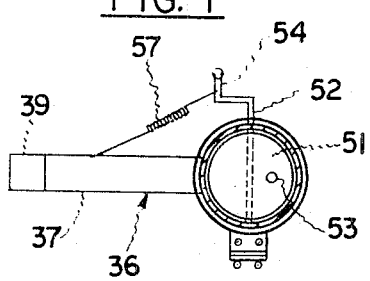
FIG. 3 represents a sectional view taken along the line B—B of FIG. 1.

Referring to FIG. 1 in the drawing, the present draught gage 10 comprises the tubular member or means 11 which serves as the supporting super-structure for the other elements making up the present gage. The manometer 12 is provided for reading the draught or draft of a vessel as explained in detail hereinafter. The manometer 12 is mounted upon and attached by virtue of the U-shaped members 14 to the sliding bar 15. The bar 15 is provided with the graduated markings or the scale 16, whereby the liquid rise in the top leg portion 17 of the manometer 12 can be read. These graduations can be in terms of whatever system of measurement is desired or utilized in computing the dead weight displacement of the vessel. Of course, the clamps 14 must rigidly attach the manometer 12 onto the member 15 to prevent erroneous readings. The manometer 12 further comprises the U-shaped portion 20.

Positioned within the tubular member 11, is the conduit means 21 which comprises the portion 22 which extends lengthwise of the member 11. The bottom end 23 of the member 22 which is in open communication with the liquid in which the vessel is immersed, is positioned at essentially the bottom level of the vessel or barge whose draught is to be determined. The conduit means 21 further comprises the section 24 which also extends lengthwise of the member 11 and which is connected in open communication with the member 22 by virtue of the connecting portion or cross-over section 25. The tube section 24 can actually be shortened considerably without affecting the operation of the present device. For example, the cross-over section 25 can be located essentially at the top of the present device. However, the embodiment shown is preferred since this minimizes the pressure drop of the gas which would occur if the gas were bubbled through the liquid that might rise in the tube 22. The conduits 22 and 24 are retained in a fixed position within the tubular member 11 by virtue of the supports 26 to which they are fixed by the U-bolts 27 or some other suitable means.

The manometer means 12 is attached to the conduit means 22 by virtue of the flexible member or hose 30. In this manner, the manometer 12 can be elevated from its position shown in FIG. 2 by sliding the supporting member 15 upwards. The supporting member 15 is slidably mounted upon the tube 11 by virtue of the clips 31 which are drilled to receive the slide-bar 32. The slide-bar 32 is rigidly attached to the tube 11 by virtue of the top support member 33, the middle support member 34, and the bottom support portion 35 of the bottom leg support. The top support 33 is provided with a grooved portion which is adapted to receive the member 15 whereby it can be displaced longitudinally or parallel to the tube 11.

The present gage further comprises the bottom positioning leg 36 as fully shown in FIG. 1. The leg 36 includes the extended portion 37 which is connected to the tubular means 11 by virtue of the portion 38 which is mounted circumferentially around the bottom extremity of the member 11. The portion 38 further comprises the extended slide-bar support 35. The extended portion 37 is provided with a magnet 39, the top surface of which is positioned on the same plane as that established by the open end 23 of the conduit means 22. In this manner, upon securing the magnet 38 to the bottom of a vessel, the open end 23 assumes a position level with the bottom of the vessel for the reasons brought out hereinafter.

After positioning the bottom leg 36, the present gage is fixed in position aboard a vessel by virtue of the top adjustable arm 40. The arm 40 comprises the extended portion 42 which is also provided with the magnet 42, the latter, however, not being mandatory. The portion 41 is rigidly attached to the circular sliding portion 43 which is adapted to longitudinally slide along the external surface of the tube 11. The arm 40 can be fixed along the length of the member 11 by virture of the butterfly nut assembly 44 which the operator would screw up tight after positioning and fixing the present gage upon a vessel for reading its draught.

The container of gaseous material 45 is provided for injecting a gaseous medium via the conduit 24 into the conduit 22 while the process of reading the draught of a vessel as described in detail below. The valve 46 is provided for controlling the flow of gaseous material which thereafter passes through the flowmeter 47 to allow the operator to determine the flow rate. The gaseous medium 45 can be any material that is not greatly soluble in water, specifically, that as employed in the manometer and that as which the vessel is immersed. Suitable gases are Freons, nitrogen, methane, and the like. The valve 46 could be any suitable valve for controlling a gaseous flow, generally a small needle valve is preferred. The flowmeter 47 is a conventional ball flowmeter comprising a glass tube containing a cylindrical ball that is lifted upwards in the gas flow whereby the operator can read a flow rate by virtue of the graduation 40 marked off on the body of the meter 47. Of course, any other suitable flowmeter can be employed.

Figures 2, 4:
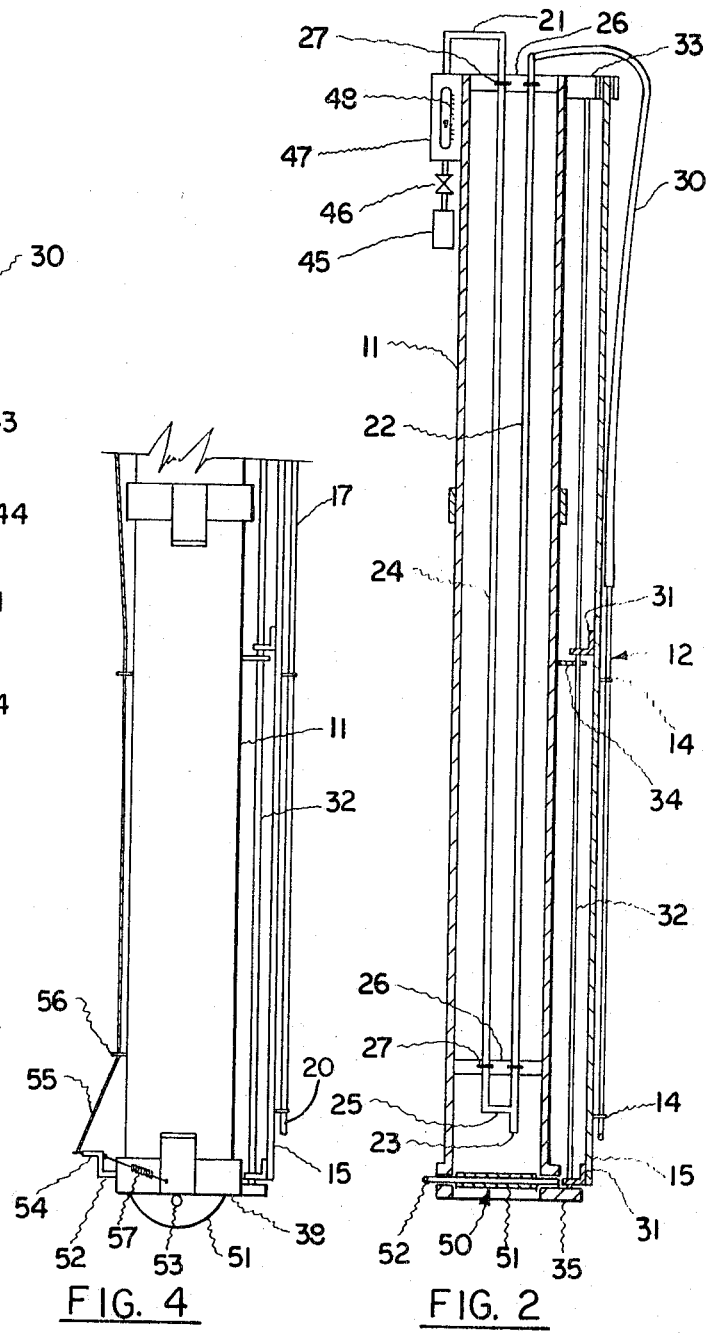
FIG. 2 depicts a sectional view taken along the line A—A of FIG. 1.
FIG. 4 is a partial front elevation view taken along the lines C—C of FIG. 1.

Referring to FIG. 2, the present gage includes the dump valve assembly 50 which is positioned in the bottom of the tubular means 11. The valve 50, which is in essence a butterfly valve, comprises the circular disc 51 which is rotatably mounted in the bottom of the tube 11 by virtue of the shaft member 52 which passes through an aperture provided in the disc 51. The collar portion 38 of the leg 36, as well as the tube 11, is bored to receive the shaft 52 whereby the disc 51 can be rotated essentially through a 90° arcuate path. The disc 51 is provided with the orifice or aperture 53 such that when the valve is closed, the tube 11 is still in open communication with the exterior for the reasons brought out hereinafter.

The dial stem or arm 52 is provided with the offset portion 54 for rotating the valve disc 51. This is preferably accomplished by connecting the valve handle 54 to the cable 55 which is strung through the eyelets 56 upwards along the longitudinal axis or lengthwise of the member 11 to a position above where an operator can upon pulling the cable 55 upwards, rotate the valve through essentially 90°. For the reasons presented below, it is preferred to have the valve in a normally closed position, for which purpose the spring 57 is provided. The spring 57 is connected to the extended arm portion 37 of the leg member 36 and the outer part of the handle 54 whereby the handle 54 is always urged downwards toward the outer part of the extended portion 37, viz toward the magnet 39. In this manner, the disc 51 will always assume a horizontal position unless rotated otherwise by the operator.

In operation, the manometer 12 is initially zeroed in by standing the superstructure or tube 11 upright. By zeroing in is meant that the reference scale and the water level in the bottom portion 20 of the manometer is set at the zero point graduation. Then the assembly is lowered into the water and the bottom leg 36 fixed to member 11 is rotated in a position underneath the vessel. In this manner, the magnet 39 upon contacting the bottom of the vessel thereby assumes a position such that the open end 23 of the tube 22 is essentially level or even with the bottom of the vessel. The adjustable arm 40 is then moved into position down upon the deck of the vessel where it is clamped in a fixed position by virtue of the adjustable clamp 44. Initially, when the gage is lowered into the water, the valve 50 is open whereby water is allowed to rush into the tube 11 and thereafter when clamped in position, the valve 50 is closed. This procedure allows the gage to be quickly inserted in the water without waiting for the water to bleed through the port 53 and fill the tube 11. After the water assumes its true level within the tube 11, the valve is closed which thereby minimizes the effect of any wave action or swells, however, the port 53 allows the water within the tube 11 to equalize with the water alongside the vessel.

After the above static condition is realized, the operator opens the valve 46 and allows sufficient gas flow from the gas source 45 as indicated by the flowmeter 47 such that the pressure required to flow downwards through the conduit 24 and out of the open end 23 of the conduit 22 is indicated by a simultaneous rise in the liquid leg 17 of the manometer 12. In other words, the manometer indicates the back pressure imposed upon the system by virtue of the gas escaping downwards through the conduit 24 and out of the open end 23. Naturally, for different water levels, the pressure required for the gas to escape out of the conduit 22 will vary and consequently, the rise of the water in a manometer leg 17 will correspondingly vary.

To falicitate the reading of the manometer 12, the supporting member 15 on which the manometer is attached, can be raised up to eye level. After determining the draught of a vessel, the above procedure is reversed for removing the gage from the vessel. When utilizing the present device on a barge, normally, readings are taken at each corner of the barge. The present gage is preferably constructed of a very light weight metal or plastic, aluminum being preferred as a material of construction with the exception of the manometer 12 which can be made of glass or a transparent plastic and the hose 30 which is either rubber or a flexible plastic.

It will be obvious to one skilled in the art that numerous modifications can be made in the present gage without departing from its true scope and spirit. For example, to facilitate zeroing of the manometer 12, the manometer can be made adjustable lengthwise with regard to the scale 16. Or, a liquid adjusting valve can be provided in the manometer section 20 for either adding or subtracting liquid from the system. Additionally, the tubular means 11, which generally is about 18 feet long, can be made in sections, preferably just two, to facilitate its transportation. Such a design requires, naturally, that the manometer and related appurtenances be also made in sections. The cable 55 can be attached to the extended portion 41 of the arm 40 such that movement of the arm 40 in a clamped position will automatically relax the cable and allow the valve 50 to close. Conversely, upon swinging the arm 41 out of position, the valve will be opened. It is to be also noted that the present device can be modified to read a negative draught. That is, where a vessel is sitting out of the water and the tube 22 is too short to reach the water, an extension can be added to the bottom thereof which is of a length sufficient to extend below the water level.

We claim:

1. A draught gage for measuring the draught of a vessel comprising in combination:
   (a) manometer means containing a liquid of essentially the same density as that in which a vessel is immersed whose draught is to be determined;
   (b) conduit means in open communication with said manometer means;
   (c) positioning means operably connected to said conduit means whereby when said conduit means and said manometer means are vertically oriented alongside a vessel for reading its draught, the lowermost end of said conduit means is positioned essentially even with the bottom of the vessel in open communication with the liquid in which the vessel is immersed;
   (d) pressure means in open communication with said conduit means and said manometer means for forceably injecting a gaseous medium into said conduit means whereupon the gaseous medium upon exerting pressure on the liquid in said manometer causes the liquid to rise in said manometer forcing the liquid upwards until the gaseous medium escapes from the open lowermost end of said conduit whereby the system assumes equilibrium and the draught of the vessel is indicated by the height of the liquid in said manometer means; and
   (e) tubular means for housing said conduit means and to which said positioning means and said pressure means are operably connected and on which said manometer means is slidably positioned whereby said manometer means can be vertically positioned to eye level to facilitate reading thereof.

2. The draught gage of claim 1 further defined as comprising:
   (f) butterfly valve means operably positioned at the bottom end of said tubular means, said valve means being provided with a relatively small opening therein whereby upon closing said valve means, said tubular means is still in open communication with the liquid in which it is immersed.

3. The draught gage of claim 2 further defined as comprising:
   (g) remote valve operating means for actuating said valve means from a position atop a vessel on which said draught gage has been operably positioned whereby upon fixing said gage in an operable position and opening said valve means, said tubular means is quickly flooded and upon closing said valve means, pressure surges created by the rise and fall of the liquid level are minimized, the small opening in said valve means allowing the liquid to assume a true level within said tubular means that corresponds to the draught of the vessel.

4. The draught gage of claim 3 further defined as comprising:
   (h) adjustable attaching means for attaching said manometer means and conduit means to the side of a vessel.

References Cited
UNITED STATES PATENTS

| | | | |
|---|---|---|---|
| 1,359,014 | 11/1920 | Alexander | 73—302 |
| 1,380,575 | 6/1921 | Merritt | 73—302 |
| 2,669,122 | 1/1950 | Silsby | 73—302 |
| 3,246,522 | 4/1966 | Rapson | 73—302 |

LOUIS R. PRINCE, Primary Examiner

D. E. CORR, Assistant Examiner